United States Patent
Lindsey et al.

(10) Patent No.: US 9,066,064 B2
(45) Date of Patent: Jun. 23, 2015

(54) CONVERSATIONS ON TIME-SHIFTED CONTENT

(71) Applicant: FrameBuzz, LLC, Austin, TX (US)

(72) Inventors: Aaron Lindsey, Austin, TX (US); Jason Kohn, Ann Arbor, MI (US); Danielle Roxberry, Austin, TX (US)

(73) Assignee: FrameBuzz, LLC, Austin, TX (US)

( * ) Notice: Subject to any disclaimer, the term of this patent is extended or adjusted under 35 U.S.C. 154(b) by 24 days.

(21) Appl. No.: 14/067,585

(22) Filed: Oct. 30, 2013

(65) Prior Publication Data

US 2014/0199046 A1    Jul. 17, 2014

Related U.S. Application Data

(60) Provisional application No. 61/753,490, filed on Jan. 17, 2013, provisional application No. 61/877,160, filed on Sep. 12, 2013.

(51) Int. Cl.
| | |
|---|---|
| *H04N 9/87* | (2006.01) |
| *G06T 11/60* | (2006.01) |
| *H04N 21/431* | (2011.01) |
| *H04N 21/472* | (2011.01) |
| *H04N 21/475* | (2011.01) |
| *H04N 21/4788* | (2011.01) |
| *G06Q 50/00* | (2012.01) |

(52) U.S. Cl.
CPC .............. *H04N 9/8707* (2013.01); *G06T 11/60* (2013.01); *G06Q 50/00* (2013.01); *H04N 21/4316* (2013.01); *H04N 21/47202* (2013.01); *H04N 21/4758* (2013.01); *H04N 21/4788* (2013.01)

(58) Field of Classification Search
None
See application file for complete search history.

(56) References Cited

U.S. PATENT DOCUMENTS

| | | | |
|---|---|---|---|
| 8,392,821 B2 | 3/2013 | DeMarco et al. | |
| 2007/0260677 A1 | 11/2007 | DeMarco et al. | |
| 2012/0150970 A1* | 6/2012 | Peterson et al. | 709/206 |
| 2013/0174007 A1 | 7/2013 | DeMarco et al. | |
| 2014/0013241 A1* | 1/2014 | Brown et al. | 715/753 |

OTHER PUBLICATIONS https://firstcutpro.com, last accessed on Feb. 10, 2014, 3 pages.
http://web.archive.org/web/201219162400/http://rollypolly.com, last accessed on Feb. 10, 2014, 2 pages.
http://blog.viddler.com/ianborg/interact-with-in-video-tags, last accessed on Feb. 10, 2014, 3 pages.

* cited by examiner

*Primary Examiner* — William C Vaughn, Jr.
*Assistant Examiner* — Eileen Adams
(74) *Attorney, Agent, or Firm* — Fish & Richardson P.C.

(57) ABSTRACT

Techniques for providing conversations on time-shifted contents for social interaction include playing a time-shifted content with a timeline in a window of an application; and displaying one or more comments and respective time points sequentially over the time-shifted content in the window as the time-shifted content is played to the respective time points along the timeline, the one or more comments associated with the respective time points in a database associating respective comments to respective time points of the time-shifted content.

30 Claims, 6 Drawing Sheets

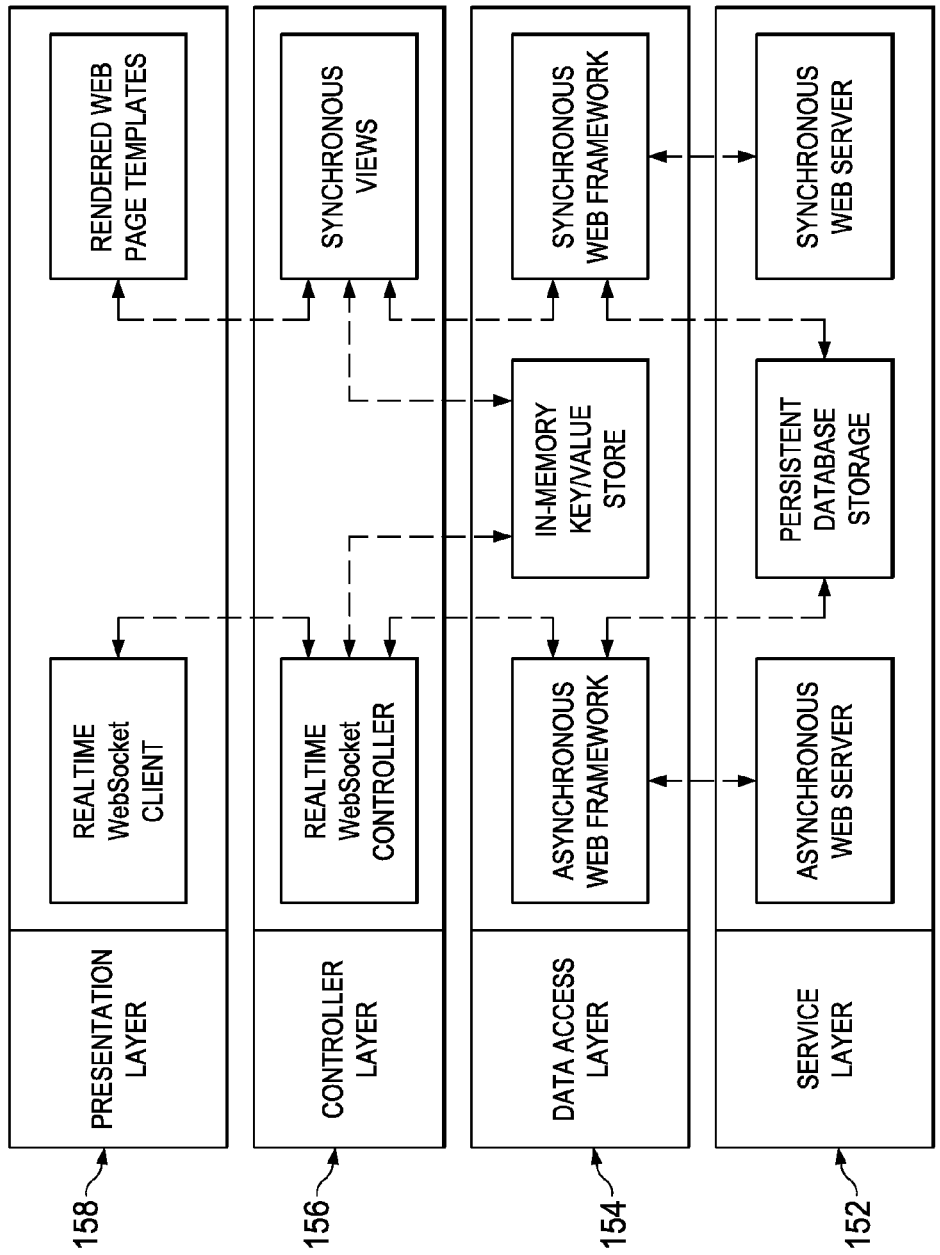

CONVERSATIONS ON TIME-SHIFTED CONTENT

CROSS-REFERENCE TO RELATED APPLICATIONS

This application claims priority under 35 U.S.C. §119 to U.S. Provisional Patent Application Ser. No. 61/753,490, filed Jan. 17, 2013, and to U.S. Provisional Patent Application Ser. No. 61/877,160, filed Sep. 12, 2013, the entire contents of both previous applications are hereby incorporated by reference herein.

TECHNICAL BACKGROUND

This disclosure relates generally to data communication and, more particularly, to providing conversations on time-shifted contents for social interaction.

BACKGROUND

Conventional systems for presentation of media such as video typically do not allow conversations on specific video frames. Social conversations around online video are usually disjointed from the online video and filled with spam. Some commenting solutions use separate social networks to have conversations around videos or use static, after-the-fact commenting.

DESCRIPTION OF DRAWINGS

FIG. 1A-1B depicts an example system architecture in accordance with implementations of the present disclosure.

SUMMARY

Figure 1A:
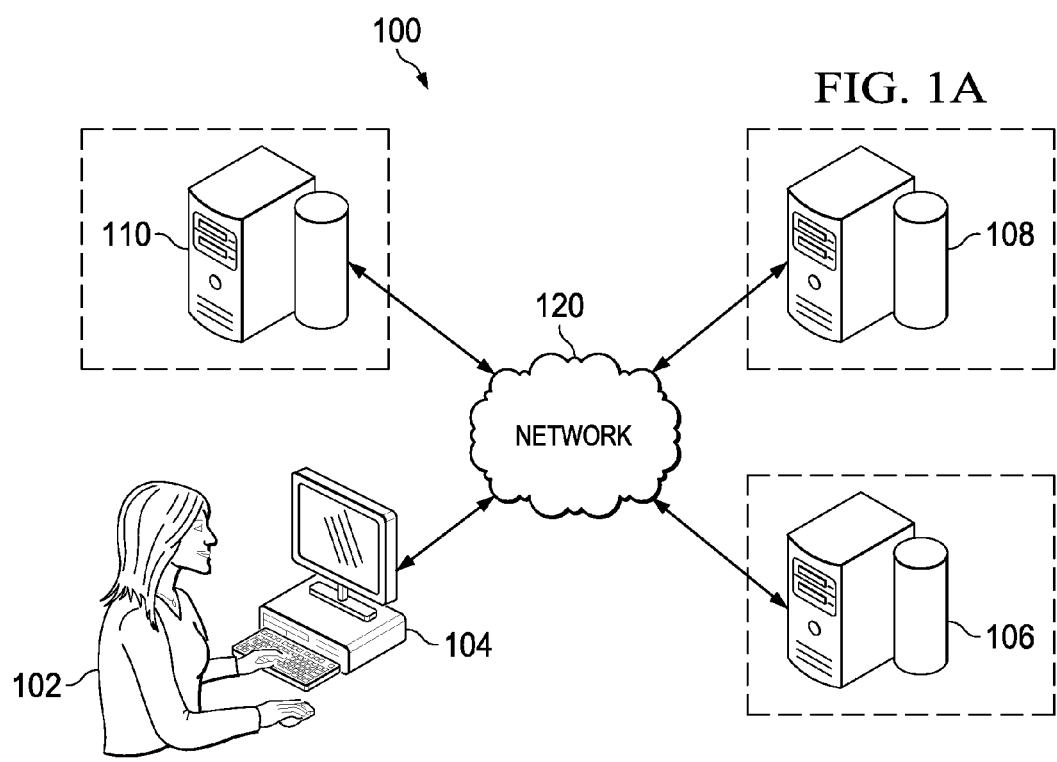

The present disclosure relates to computer-implemented methods, software, and systems for providing conversations on time-shifted contents for social interaction. In one general embodiment, a computer-implemented method executed by one or more processors includes playing a time-shifted content with a timeline in a window of an application; and displaying one or more comments and respective time points sequentially over the time-shifted content in the window as the time-shifted content is played to the respective time points along the timeline, the one or more comments associated with the respective time points in a database associating respective comments to respective time points of the time-shifted content.

Other general implementations include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

A first aspect combinable with any of the general implementations further includes presenting a first comment and a first time point over the time-shifted content in the window when the time-shifted content is played to the first time point along the timeline, the first comment associated with the first time point in a database associating respective comments to respective time points of the time-shifted content.

A second aspect combinable with any of the previous aspects further includes presenting the first comment and the first time point at a first position when the time-shifted content is played to the first time point of the time-shifted content along the timeline.

In a third aspect combinable with any of the previous aspects, the first comment and the first time point move over the time-shifted content in the window as the time-shifted content is played along the timeline.

In a fourth aspect combinable with any of the previous aspects, the first position is on a top-right corner of the window.

A fifth aspect combinable with any of the previous aspects further includes moving, downward, one or more earlier comments presented in the window, the one or more earlier comments associated with respective earlier time points of the time-shifted content in the database and the respective earlier time points earlier than the first time point.

A sixth aspect combinable with any of the previous aspects further includes presenting a second comment and a second time point at the first position, when the time-shifted content is played to the second time point of the time-shifted content along the timeline, the second comment associated with the second time point in the database; and moving the first comment and the first time point to a second position.

In a seventh aspect combinable with any of the previous aspects, the second position is immediately below the first position.

In an eighth aspect combinable with any of the previous aspects, presenting a first comment and a first time point includes determining that the first comment is associated with the first time point of the time-shifted content in the database, and in response, presenting the first comment and the first time point at the first position when the time-shifted content is played to the first time point along the timeline.

In a ninth aspect combinable with any of the previous aspects, the first comment is provided by a first user of the application, and the first user is associated with the first comment in the database.

In a tenth aspect combinable with any of the previous aspects, the first user is associated with one or more of a first user name, a first user icon, and a first user profile in a registration database.

In an eleventh aspect combinable with any of the previous aspects, the first user name and the first user icon are presented, together with the first comment and the first time point, at the first position, when the time-shifted content is played to the first time point along the timeline.

In a twelfth aspect combinable with any of the previous aspects, the application is a plugin installed in a web server.

In a thirteenth aspect combinable with any of the previous aspects, the time-shifted content includes one or more of a video content, an audio content, a text content, a picture content, and any combination thereof.

A fourteenth aspect combinable with any of the previous aspects further includes selecting specific comments associated with a user playing the time-shifted content, and presenting only the specific comments as the time-shifted content is played to specific time points associated with the specific comments.

A fifteenth aspect combinable with any of the previous aspects further includes receiving a first reply to the first comment; storing the first reply in the database; and associating the first reply to the first comment in the database.

A sixteenth aspect combinable with any of the previous aspects further includes notifying the first reply to the first user.

A seventeenth aspect combinable with any of the previous aspects further includes hiding the first reply as the time-shifted content is played.

An eighteenth aspect combinable with any of the previous aspects further includes determining that the first comment in the window is clicked at a specific time point of the time-shifted content, and in response: pausing the time-shifted content at the specific time point, and presenting the first comment, the first time point and one or more replies associated with the first comment in a portion of the window.

A nineteenth aspect combinable with any of the previous aspects further includes determining that the first time point is clicked, and in response, jumping the time-shifted content to a time point ahead of the first time point by a predefined period.

In a twentieth aspect combinable with any of the previous aspects, the first comment is set to be visible to one or more particular users.

A twenty-first aspect combinable with any of the previous aspects further includes determining that a user playing the time-shifted content is not within the one or more particular users, and in response, hiding the first comment as the time-shifted content is played.

A twenty-second aspect combinable with any of the previous aspects further includes determining that a user playing the time-shifted content is within the one or more particular users, and in response, presenting the first comment as the time-shifted content is played to the first time point along the timeline.

A twenty-third aspect combinable with any of the previous aspects further includes determining that a second comment is being input when the time-shifted content is played to a second time point of the time-shifted content along the timeline; storing the second time point in the database; determining that the second comment is completed; storing the second comment in the database; associating the second comment with the second time point in the database; and presenting the second comment and the second time point at the first position.

In a twenty-fourth aspect combinable with any of the previous aspects, the time-shifted content is paused for playing during the input of the second comment and resumes playing when determining that the second comment is completed.

In a twenty-fifth aspect combinable with any of the previous aspects, the time-shifted content is kept playing during the input of the second comment.

In a twenty-sixth aspect combinable with any of the previous aspects, the time-shifted content is set to allow conversation from one or more specific users.

In a twenty-seventh aspect combinable with any of the previous aspects, the conversation includes one or more of a comment and a reply.

A twenty-eighth aspect combinable with any of the previous aspects further includes determining that a user playing the time-shifted content is not within the one or more specific users, and in response, refusing to receive conservation from the user.

A twenty-ninth aspect combinable with any of the previous aspects further includes determining that a user playing the time-shifted content is within the one or more specific users, and in response, allowing conservation from the user.

In a thirtieth aspect combinable with any of the previous aspects, the time-shifted content is published by a content provider on a server, and one or more of the content provider and an administrator of the server sets rules for moderating conservation associated with the time-shifted content, wherein the conservation includes one or more of comments and replies.

In a thirty-first aspect combinable with any of the previous aspects, the rules include one or more of lists of blocked/allowed words in the comments, allowing/blocking profanity, and settings for how the comments awaiting moderation are displayed and how moderators are notified.

A thirty-second aspect combinable with any of the previous aspects further includes determining a ranking score for each comment associated with respective time point of the time-shifted content in the database; and presenting, based on the ranking score, the comment associated with the respective time point of the time-shifted content.

A thirty-third aspect combinable with any of the previous aspects further includes determining that a specific user is a star commenter, and in response, setting high ranking scores for specific comments or/and replies provided by the specific user.

In a thirty-fourth aspect combinable with any of the previous aspects, presenting the comment associated with the respective time point of the time-shifted content includes only presenting the comment with the highest ranking score among multiple comments associated with the respective time point.

In a thirty-fifth aspect combinable with any of the previous aspects, determining a ranking score for each comment includes determining a ranking score for each comment based on an algorithm.

A thirty-sixth aspect combinable with any of the previous aspects further includes receiving a request to play the time-shifted content in the window of the application from a second user of the application.

In a thirty-seventh aspect combinable with any of the previous aspects, the request includes a link directing to the time-shifted content stored in a content server.

In a thirty-eighth aspect combinable with any of the previous aspects, the application is operated in an application server, and wherein the application server is different from the content server and connected to the content server via a network.

A thirty-ninth aspect combinable with any of the previous aspects further includes providing a new link incorporating an embed code based on the link, the embed code enabling commenting functionalities for the time-shifted content when the new link is posted on a web server to play the time-shifted content.

A fortieth aspect combinable with any of the previous aspects further includes generating reports detailing behavior of users associated with comments/replies of one or more time-shifted contents in the database.

In a forty-first aspect combinable with any of the previous aspects, the users are one or more of commenters providing the comments and content publishers providing the one or more time-shifted contents.

A forty-second aspect combinable with any of the previous aspects further includes determining, based on a criteria, that contents are relevant to a given user of the application, and in response, providing the contents to the given user.

In a forty-third aspect combinable with any of the previous aspects, the contents include one or more of time-shifted contents, comments or/and replies associated with specific time-shifted contents, websites, and other users' profiles.

In a forty-fourth aspect combinable with any of the previous aspects, the criteria is based on one or more of social interactivities of the given user, preferences of the given user, and behavior of the given user.

In a forty-fifth aspect combinable with any of the previous aspects, the application includes asynchronous and synchronous services operating in tandem to support aspects of the application.

In a forty-sixth aspect combinable with any of the previous aspects, the synchronous services include one or more of signing into the services, loading user profile pages, and sending notifications of new comments.

In a forty-seventh aspect combinable with any of the previous aspects, the asynchronous services include one or more of supporting commenting, social interaction, and analytics tied to user behavior at specific time points during playing of time-shifted contents.

A forty-eighth aspect combinable with any of the previous aspects further includes receiving a request to play the time-shifted content from a user and activating one or more services of the asynchronous services for the user.

A forty-ninth aspect combinable with any of the previous aspects further includes presenting a map to graphically weighting comments associated with individual time points along the timeline.

A fiftieth aspect combinable with any of the previous aspects further includes determining that a point of the map associated with a specific time point of the time-shifted content is clicked, and in response, jumping the time-shifted content to the specific time point.

Various implementations of a computing system according to the present disclosure may provide one or more of the following features. For example, the computing system can provide a platform for time-shifted contents (e.g., online video) that presents threaded, moment-by-moment conversations within a display screen itself during playing the time-shifted contents. The computing system enables social conversations around every moment of the time-shifted contents, curates comments tied to specific moments for more contextual discussions, and gives content providers a new way to engage viewers. The computing system also enables viewers browse comments and conversations from other viewers, add their own comments at any moment of the contents, and post responses to comments from other viewers. The computing system also allows specific users (e.g., actors, directors and others involved in the production of the time-shifted contents) to create personal, annotated comment streams on the time-shifted contents.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

The present disclosure describes a system and method for providing threaded, moment-by-moment conversations on time-shifted contents. The time-shifted contents can be one or more of video contents, audio contents, text contents, picture contents, and any combination thereof. Implementations of the present disclosure can provide a social medial platform that brings social interaction to time-shifted contents. The platform can allow users view comments from other users during presentation of time-shifted contents and provide their own comments or replies at specific time points of timelines of the time-shifted contents.

FIG. 1A depicts an example system architecture 100 in accordance with implementations of the present disclosure. The example system architecture 100 includes a user 102 and a client device 104, server systems 106, 108, 110 and a network 120. In some examples, the client device 104 can include any appropriate type of device such as a personal computer, a handheld computer, a notebook, a tablet computing device, a personal digital assistant (PDA), a smart mobile phone, an enhanced general packet radio service (EGPRS) mobile phone, a media player, a navigation device, an email device, a text message device, a game console, or any appropriate combination of any two or more of these data processing devices or other data processing devices. In the example of FIG. 1A, and as used by way of example throughout the remainder of the present disclosure, the client device 104 is provided as a computing device with a display, such as a personal computer.

In some examples, the client device 104 and the server systems 106, 108, 110 communicate with one another over the network 120. In some examples, the network 120 can include a large computer network, such as a local area network (LAN), a wide area network (WAN), the Internet, a cellular network, or a combination thereof connecting any number of communication devices, computing devices, and/or server systems.

In some examples, each server system 106, 108, 110 can include one or more computing devices and one or more machine-readable repositories, or databases. In the depicted example, the server system 106 is an application server associated with an application provider, the server system 108 is a content server associated with a content provider (e.g., YouTube or Vimeo Videos) for providing time-shifted contents (e.g., videos, movies, music), and the server system 110 is a web server associated with a web service provider (e.g., Yahoo, NY Times). In some examples, a server system can be associated with an entity by being owned and operated by the entity. In some examples, a server system can be associated with an entity by being provided on behalf of the entity (e.g., by a cloud service provider).

In some implementations, the server system 106 can provide an application for providing conversations on time-shifted contents. The application can include functionalities of playing the time-shifted contents and functionalities of commenting the time-shifted contents. In some examples, the user 102 can be a user of the application. The user 102 can register with the server system 106, and be associated with a user name, a user icon, a user profile page in a registration database stored in the server system 106. The user can provide comments or replies to a time-shifted content played by the application. In some examples, the user 102 is a viewer of a time-shifted content played by the application. The user 102 can be notified to register with or log in the server system 106 such that the user 102 can provide comments or replies to the time-shifted content.

In some implementations, the user 102 uses the client device 104 to transmit a request to the server system 106 for playing a time-shifted content using the application. In some examples, the request includes a link, and the link is directed to the time-shifted content stored in a content server (e.g., the server system 108). In some examples, the time-shifted content is stored in the client device 104 itself or in the server system 106.

In some implementations, the application includes real-time (asynchronous) services and synchronous services operating in tandem to support different aspects of the application. In some examples, the synchronous services include one or more of signing into the service, loading user profile pages, sending email notifications of new comments) employ a standard web software stack. In some examples, the asynchronous services include one or more of services that support commenting, social interaction and analytics tied to user behavior at specific moments during the playback of a time-shifted content. The application can be based on a real-time services architecture with respect to a timeline of the time-shifted content. The real-time services architecture around the timeline of a time-shifted content can provide a core functionality of the application. It can allow a user to load an online video from multiple external sources in the application, and enable real-time user interaction around the timeline of the time-shifted contents.

As illustrated in FIG. 1B, the real-time services architecture 150 of the application can include services layer 152, application layer (not shown), data access layer 154, controller layer 156 and presentation layer 158. In some examples, the services layer 152 includes inbound request routing, e.g., directing traffic to either real-time or synchronous elements of the architecture. In some examples, the application layer includes a real-time (asynchronous) web server, pubsub services, in-memory cache, and persistent storage. In some examples, the data access layer 154 includes custom connection class real-time interfaces. In some examples, the controller layer 156 includes API (Application Programming Interface) brokering communication between real-time web server and player UI (User Interface). In some examples, the presentation layer 158 includes player UI client.

In some implementations, the application is a web-based application. Supporting the real-time services architecture can be an infrastructure of web servers providing the services layer 152 and the application Layer, where asynchronous and synchronous web servers, as well as real-time and persistent data stores reside. After a real-time connection is established between a user (e.g., a player client) and the real-time web server, the user activates all services necessary for using real-time services of the application (e.g., posting a comment, adding a comment as a favorite, selecting "follow" to follow another commenter, etc.). When a user initiates an event in the application (for example, adding a comment), the presentation layer client sends a message to the controller layer 156, which directs it to the data access layer 154 based on the class composition of the message. The custom connection class interface in the data access layer 156 uses a real-time communication channel to push the message to both the in-memory key value store optimized for speed and persistent data storage.

In some implementations, time-shifted contents with the application's commenting functionalities can be embedded on a website (e.g. the server system 110), instead of the server system 106. Users of the application can use the application to add the application's commenting functionalities to any time-shifted contents (e.g., online videos). The users can include website owners, bloggers or other video publisher users. In some examples, the users can enter a link (e.g., an online video URL) and generate an embed code, which can be copied to a website to add a time-shifted content (e.g., a video) with the commenting functionalities of the application. In some examples, the application is a plugin. The users can enter a link directing to a time-shifted content or select from an existing library of time-shifted contents, and add a time-shifted content with the commenting functionalities of the application to a page on their websites.

Figure 2A:
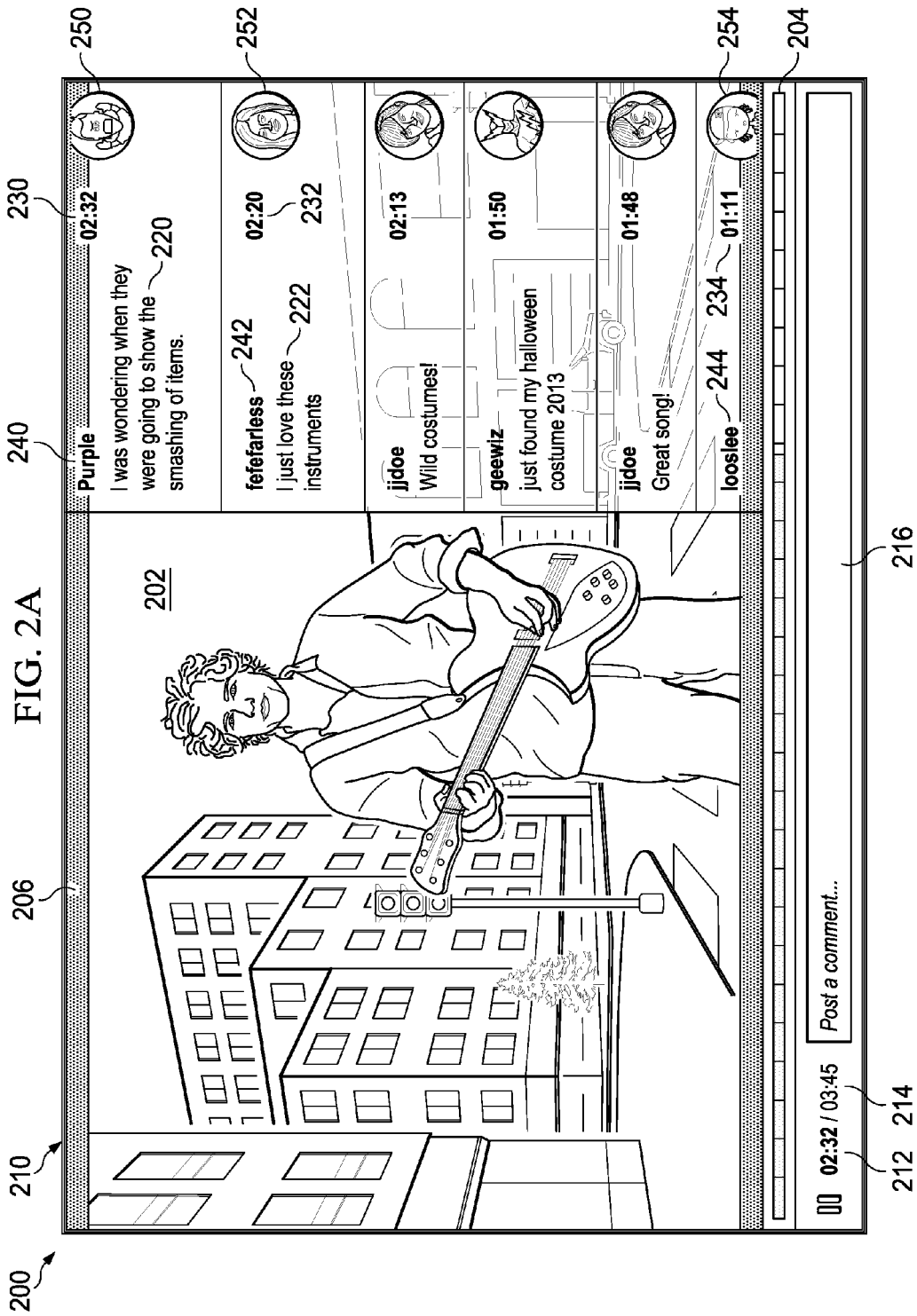
FIGS. 2A-2B depict an example application architecture in accordance with implementations of the present disclosure.
Figure 2B:
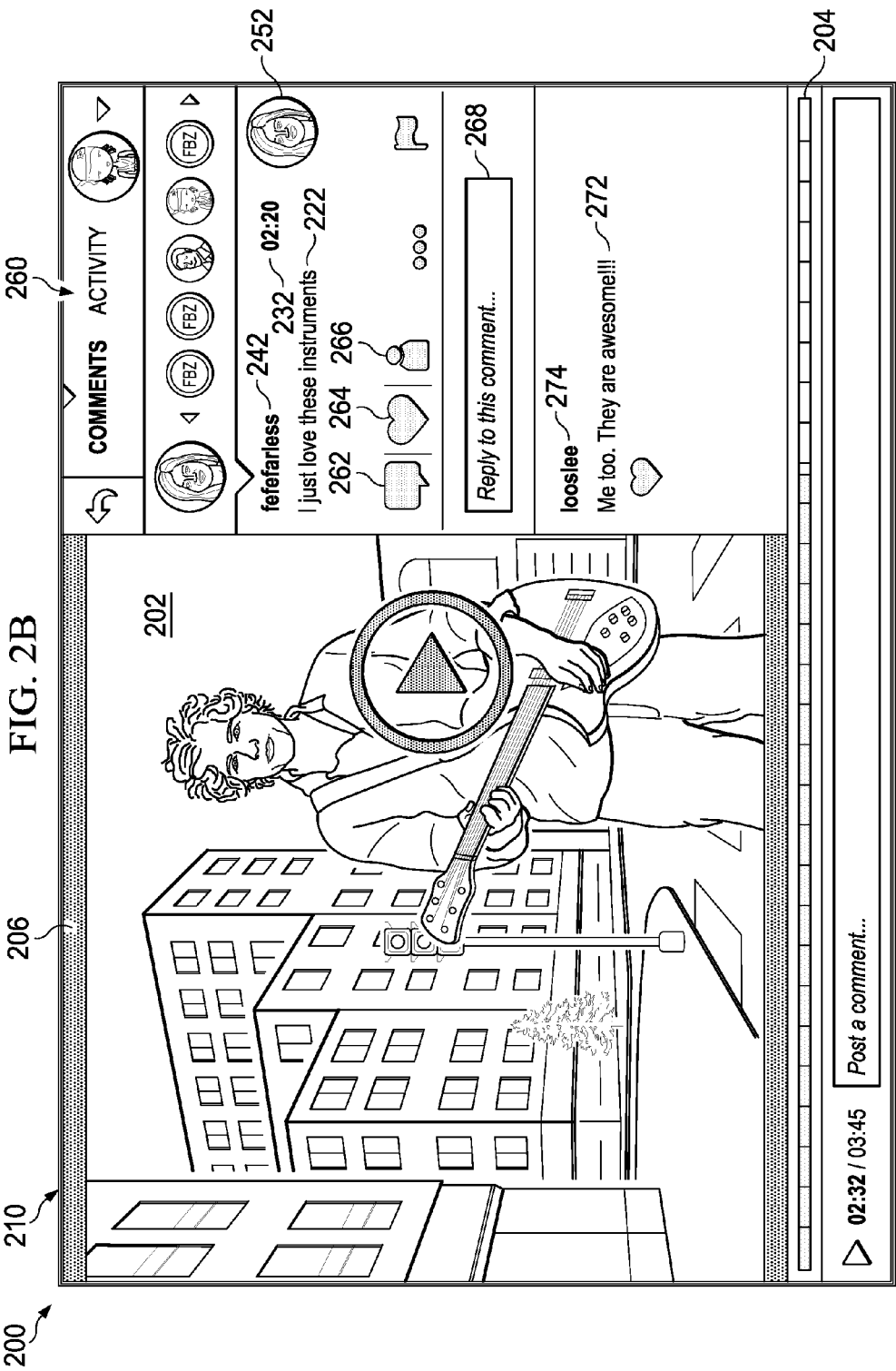

FIGS. 2A-2B depict an example application architecture 200 in accordance with implementations of the present disclosure. The application can include functionalities of playing the time-shifted contents and commenting functionalities, as discussed above. The application can be provided by a service system (e.g., the service system 106 of FIG. 1A), or embed in a web site (e.g., the service system 110 of FIG. 1A).

In some implementations, the application 200 includes an interface 210. The interface 210 includes a window 206 for playing a time-shifted content 202 (e.g., a video) with a timeline. The interface 210 can include a timeline 204 below the window 206. The timeline 204 corresponds to the timeline of the time-shifted content 202, which can be divided into a plurality of sections corresponding to individual time points of the timeline of the time-shifted content 202. A user can click a specific point in the timeline 204 and jump the time-shifted content 202 to a specific time point that corresponds to the specific point of the timeline 204. The interface 210 can show a total length 214 of the time-shifted content and a real-time time point 212 that changes with the playing of the time-shifted content 202. In some examples, the interface 210 includes a box 216 for inputting comments.

When the time-shifted content 202 is playing to a specific time point 212 (e.g., "02:32" in FIG. 2A) of the timeline, a specific comment 220 associated with the specific time point is presented, together with the specific time point 212, i.e., the presented specific time point 230. The specific comment 220 is associated with the specific time point 212 in a database. The database associates respective comments to respective time points of the time-shifted content. In some implementations, the specific comment 220 and the specific time point 230 are presented outside of the window 206 but within the interface 210.

In some implementations, the specific comment 220 and the specific time point 230 are presented within the window 206, as illustrated in FIG. 2A. In some examples, the specific comment 220 and the specific time point 230 appear directly over the time-shifted content 202. In some examples, the specific comment 220 and the specific time point 230 are presented at a specific position in the window, and the specific position can be in a top-right corner of the window 206. Earlier comments (e.g., comment 222) of the time-shifted content 202 can be presented on a right section of the window 206, below the specific position. The right section can have a transparent or partially transparent background, such that the time-shifted content under the right section is still visible to viewers. In some examples, the latest comment (e.g., the specific comment 220) is presented on the top of the right section, other earlier comments (e.g., the comment 222), together with associated time points (e.g., time point 232) that are earlier than the specific time point 230, are moved downward to the bottom of the right section and eventually drop off the window 206, e.g., a comment associated with a time point 234.

In some implementations, respective comments of the time-shifted content are provided by respective users. The users can be the users of the application and have respective user names and user icons. The user names and the user icons can be associated with the respective comments and respective time points in the database. In some implementations, the user names and the user icons are presented, together with the associated comments and time points. For example, in FIG. 2A, user name 240 and user icon 250 are presented with the comment 220 and the time point 230. User name 242 and user icon 252 are presented with the comment 222 and 232. User name 244 and user icon 254 are presented with the time point 234 and a comment (that is dropped off the window).

In some implementations, a map is presented in the interface 210 to graphically weighting comments associated with individual time points along the timeline. A point of the map associated with a specific time point is clicked, and in response, the time-shifted content is jumped to the specific time point for playing.

In some examples, the map is a heat map graphically illustrates which time points on the timeline have generated the most social conversation. The heat map can augment the timeline to illustrate graphically where the most comments have been made. The user can click around the heat map to forward and rewind the time-shifted content and reshuffle the comment made according to a ranking algorithm. Color used and placement on the interface 210 can be customized.

In some implementations, when a viewer (e.g., a user playing the time-shifted content) clicks a comment presented in the window (e.g., the comment 222 in FIG. 2A), the application can pause the time-shifted content and present the comment and associated replies in a section of the window (e.g., the right section 260), as illustrated in FIG. 2B. The comment 222 and the associated time point 232 can be presented in the section 260, together with the user name 242 and the user icon 252. In some examples, the viewer can click the presented time point 232 and jump the time-shifted content 202 to the time point of the timeline (e.g., "02:20"). Conversations associated with the comment 222 can be also presented. For example, a reply 272 to the comment 222 is presented below the comment 222, together with the replier's user name 274. In some implementations, interactivities tools, including "reply" 262 for replying to the comment 222, "favorite" 264 for setting the comment 222 as favorite, "follow" 266 for following the commenter 232, can be presented below the comment 222. In some examples, when a viewer clicks the "reply" 262, a box 268 can be presented below the "reply" 262 for receiving a reply. When the reply is posted, the posted reply can be associated with the comment 222 in the database associating respective comments to respective time points of the time-shifted content.

Figure 3:
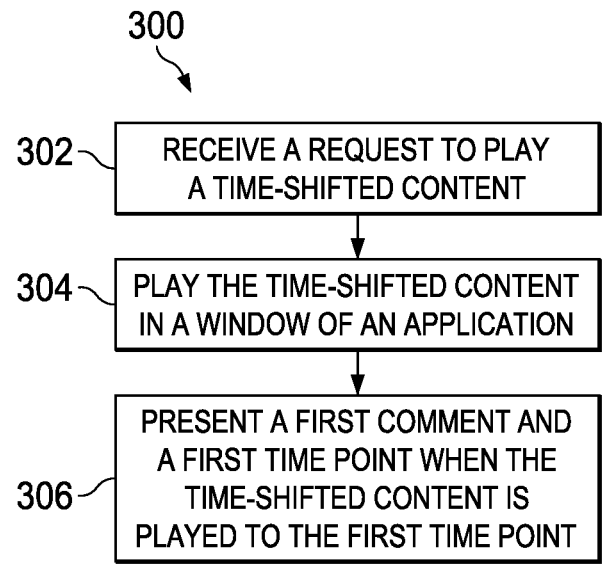
FIG. 3 depicts an example process that can be executed in accordance with implementations of the present disclosure.

FIG. 3 depicts an example process that can be executed in accordance with implementations of the present disclosure. The process can be executed by an application as discussed above (e.g., the application 150 of FIG. 1B, the application 200 of FIGS. 2A-2B). The application can be operated in a server system (e.g., the server system 106 of FIG. 1A), or in a web server (e.g., the server system 110 of FIG. 1A). The application can provide conversations (e.g., comments and replies) on time-shifted contents. The time-shifted contents can be one or more of video contents, audio contents, text contents, picture contents, and any combination thereof.

A request to play a time-shifted content is received (302). In some implementations, a user of the application can send a request to play the time-shifted content in the window of the application. The request can include a link directing to the time-shifted content stored in a content server (e.g., the server system 108 of FIG. 1A). The server system or the web server where the application is operated can be different from the content server and connected to the content server via a network. The time-shifted content can include a timeline, and respective sections of the time-shifted content are corresponding to respective time points of the timeline.

The time-shifted content is played in a window of an application (304). After receiving the request, the application can play the time-shifted content in a window of the application (e.g., the window 206 of FIG. 2A) along the timeline.

A first comment and a first time point is presented when the time-shifted content is played to the first time point (306). In some implementations, when the time-shifted is played to a first time point, a first comment is presented, together with the first time point. The first comment is associated with the first time point in a database. The database associates respective comments to respective time points of the timeline of the time-shifted content.

In some implementations, the first comment and the first time point appear over the time-shifted content as the time-shifted content is played. The first comment and the first time point can be presented at a first position in the window, and the first position can be in a top-right corner of the window. In some examples, one or more earlier comments presented in the window are moved downward to the bottom of the window. The one or more earlier comments are associated with respective earlier time points of the time-shifted content in the database and the respective earlier time points are earlier than the first time point.

In some implementations, when the time-shifted content is played to a second time point of the time-shifted content along the timeline, a second comment is presented at the first position, together with the second time point. The first comment and the first time point are moved to a second position. If there is no comment between the first time point and the second time point along the timeline, the second position can be immediately below the first position.

In some implementations, the application can determine that the first comment is associated with the first time point of the time-shifted content in the database, and then present the first comment and the first time point when the time-shifted content is played to the first time point along the timeline.

In some implementations, one or more comments and respective time points are presented sequentially over the time-shifted content in the window as the time-shifted content is played to the respective time points along the timeline. The one or more comments are associated with the respective time points in the database.

In some implementations, the first comment is provided by a first user of the application, and the first user is associated with the first comment in the database. In some examples, the first user is associated with a first user name, a first user icon, and a first user profile in a registration database. In some examples, the first user name and the first user icon are presented, together with the first comment and the first time point, at the first position, when the time-shifted content is played to the first time point along the timeline.

In some implementations, only specific comments are selected to present to a user playing the time-shifted content, as the time-shifted content is played to specific time points associated with the specific comments. The user can be associated with the specific comments in the database.

In some implementations, the application allows a user playing the time-shifted content to reply to comments presented. The user can browse a comment presented by clicking the comment in the window at a specific time point of the time-shifted content. The comment can be provided by a specific user of the application (e.g., a user with the user name 242 of FIG. 2B). The application can pause playing of the time-shifted content and present the comment, the specific time point and one or more replies associated with the comment in a portion of the window (e.g., the portion 260 of FIG. 2B), together with a user name of the specific user. The application can receive a reply to the comment, store the reply in the database, and associate the reply to the comment in the database. The application can present the reply (e.g., the reply 272 of FIG. 2B) and a user name associated with the user (e.g., the user name 274 of FIG. 2B). In some examples, after the reply is posted, the application can notify the reply to the specific user by email or message within a server system.

In some implementations, the user can click the specific time point presented in the portion and jump the time-shifted content to a time point of the timeline ahead of the specific time point by a predefined period. In some examples, the predefined period can be 0 second, 1 second, 2 seconds or 3 seconds. The time-shifted content will be played out from the time point, including the comment appearing in a comment stream. In some examples, the user can resume the playing of the time-shifted content by clicking a play button. During playing, the comment and the specific time point are presented in the window, and the replies associated with the comment can be hidden from viewing.

In some implementations, the first comment is set to be visible only to one or more particular users. In some examples, a user playing the time-shifted content is determined to be not within the one or more particular users, and the first comment is hidden from the user as the time-shifted content is played. In some examples, a user playing the time-shifted content is determined to be within the one or more particular users, and the first comment is presented as the time-shifted content is played to the first time point of the time-shifted content along the timeline.

In some implementations, the application allows a user to launch private conversations for specific time-shifted contents. In addition to participating in public conversations around time-shifted contents, a user can create a private time-shifted content that is accessible only to other users specifically invited to access. Using the private conversations tool on any time-shifted contents displayed with the application, the user can send invitations to selected friends or other users to participate in a private conversation that is visible only to invitees. Invitees may be individuals who currently have a user account (which the application invites via a notification) or individuals who do not (which the application invites via email).

In some implementations, the time-shifted content is set to allow conversations from one or more specific users. The conversation can include one or more of comments and replies. In some examples, a user playing the time-shifted content is determined to be not within the one or more specific users, and a conservation from the user is not accepted. In some examples, a user playing the time-shifted content is determined to be within the one or more specific users, a conservation from the user can be accepted.

In some implementations, a user can create annotated time-shifted content (e.g., video) using the application. The user can be a website owner, a video blogger and other video publisher users. The user can use the application to create "annotated videos." Using the application, the user can annotate moments of a video with comments that persist for all subsequent views of that video, regardless of how other comments on that video are presented.

In some implementations, the time-shifted content is published by a content provider on a server system (e.g., the server system 106 of FIG. 1A), and one or more of the content provider and an administrator of the server system sets rules for moderating conservation associated with the time-shifted content. The conservation can include one or more of comments and replies. In some examples, the rules include one or more of lists of blocked/allowed words in the comments, allowing/blocking profanity, and settings for how the comments awaiting moderation are displayed and how moderators are notified.

In some implementations, conversations around the time-shift content (e.g., video) can be moderated. The application can provide tools to allow website owners, video bloggers and other video publisher users to set parameters for conversations around videos they post. These users can moderate comments, configure lists of blocked/allowed words in comments, allow or block profanity, and configure settings for how comments awaiting moderation are displayed and how moderators are notified. Users can also create custom moderator rule lists to apply sets of settings to groups of videos they publish.

In some implementations, a ranking score is determined for each comment associated with respective time point of the time-shifted content in the database. The ranking score can determine where the comment is ranked. Based on the ranking score, the comment associated with the respective time point of the time-shifted content is presented. In some implementations, a specific user can be determined as a star commenter, and high ranking scores for specific comments or/and replies provided by the specific user can be set. In some examples, only the comment with the highest ranking score among multiple comments associated with the respective time point is presented as the time-shifted content is played. In some examples, the ranking score for each comment can be determined based on an algorithm.

In some implementations, the algorithm uses a point scoring formula to decide which comment appears at most relevant time while the user views the time-shifted content. The algorithm can create a ranking score based on one or more of the current time point in the timeline, the number of comments in a comments thread, a date stamp of the thread, a total content length in seconds and total comments for the entire time-shifted content.

In some implementations, comments embedded within the timeline of a given video may be more or less likely to display for a subsequent user depending on a number of factors, determined by an algorithm. For example, if multiple top-level comments have been added at a time point 03:32 of a given video, subsequent users will not see all comments; the algorithm determines which comment to display for a given user. Users such as website owners, video bloggers and other video publisher users of the application have an option to designate certain users as "star commenters." Comments from these designated star commenters appear for all subsequent users, regardless of what the algorithm dictates would otherwise display.

In some implementations, reports can be generated to detail behavior of users associated with comments/replies of one or more time-shifted contents in the database. The users can be one or more of commenters providing the comments and content publishers providing the one or more time-shifted contents.

In some implementations, the application provides tools for website owners, video bloggers and other video publisher users to generate reports detailing behavior of commenters around the videos they publish, and across multiple videos on their site.

In some implementations, based on a criteria, contents can be determined to be relevant to a given user of the application, and in response, the contents can be provided to the given user. In some examples, the contents include one or more of time-shifted contents, comments or/and replies associated with specific time-shifted contents, websites, and other users' profiles. In some examples, the criteria is based on one or more of social interactivities of the given user, preferences of the given user, and behavior of the given user. In some examples, an algorithm can be used to select and display relevant comments by corresponding user dialogue acts (e.g., questions, replies) with content archetypes (e.g., educational, social, Q&A).

In some implementations, the application can discover new conversations for users. The application can include a logic that identifies other conversations and the time-shifted content around which those conversations exist. Using social interactivity functions of the application, such as "reply", "favorite", "follow" (e.g., the "reply" 262, the "favorite" 264, the "follow" 266 of FIG. 2B), as well as tracking user preferences and behavior, the application can provide tailored recommendations to the user of other conversations that would be of interest to the user. Those conversations may be embedded on any website, such as a website on which the user has viewed time-shifted contents using the application previously, a website which the user has never previously visited, and another user's profile page.

Figure 4:
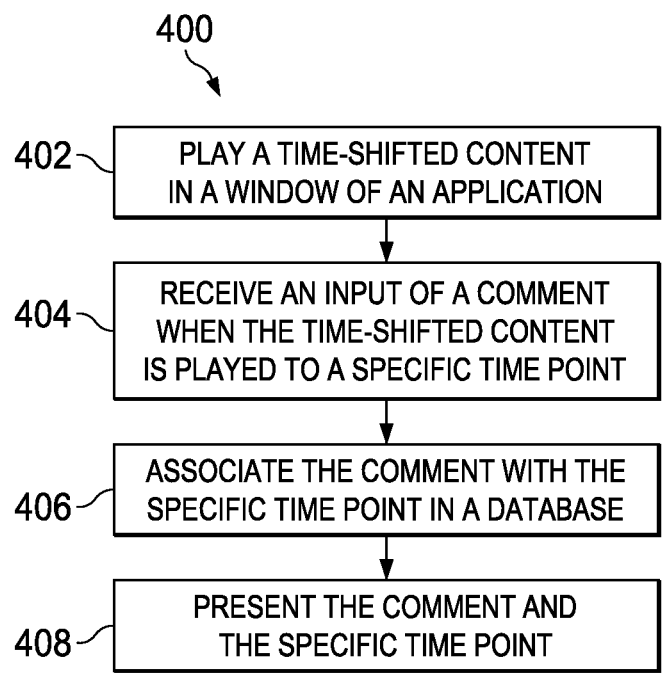
FIG. 4 depicts an example process that can be executed in accordance with implementations of the present disclosure.

In some implementations, a user playing the time-shifted content can provide a comment at any time point of a timeline as a time-shifted content is played in a window of an application, as illustrated in FIG. 4.

A time-shifted content is played in a window of an application (402). In some implementations, a user can send a request to play the time-shifted content in the window of the application. The user can be a registered user of the application or a viewer. In some examples, the user can be a content provider providing the time-shifted content.

An input of a comment is received when the time-shifted content is played to a specific time point (404). The comment can be provided by the user providing the time-shifted content or the user playing the time-shifted content. The application can determine that the comment is being input when the time-shifted content is played to the specific time point along the timeline. The specific time point can be stored in a database associating respective comments to respective time points of the time-shifted content. The application can determine that the comment is completed, and the completed comment can be stored in the database. The comment can be associated to the specific time point in the database (406). In some examples, the comment and the specific time point can be associated with the user providing the comment, e.g., associated with a user name or/and a user icon of the user.

The comment and the specific time point are presented (408). In some examples, the completed comment and the specific time point are presented at a position within the window, e.g., in a top-right corner of the window as illustrated in FIG. 2A. In some examples, during the input of the second comment, the time-shifted content is paused for playing. When the comment is completed, the time-shifted content resumes playing. In some examples, the time-shifted content is kept playing during the input of the comment.

Figure 5:
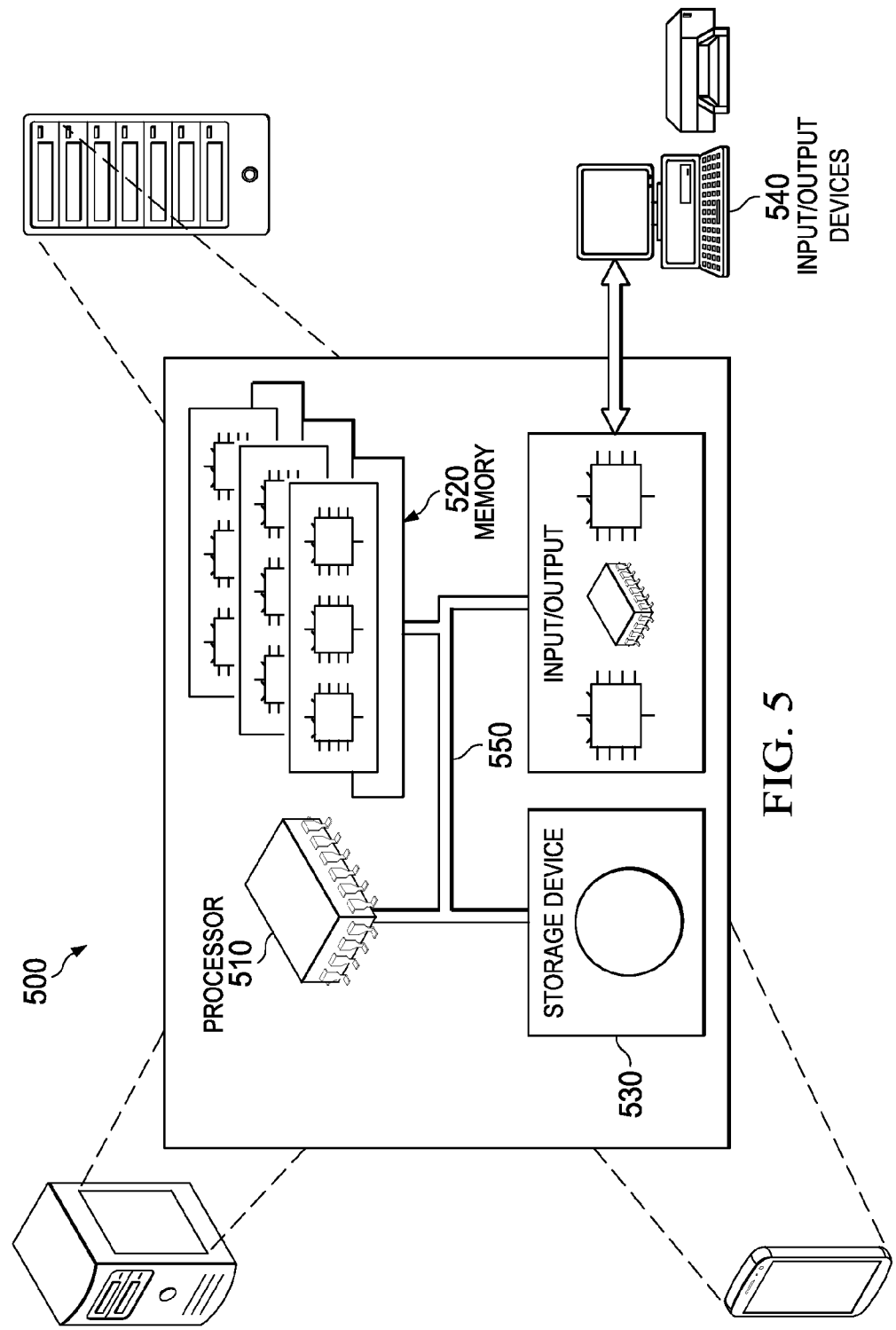
FIG. 5 depicts a schematic diagram of an example computing system that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors, the method comprising:
   playing a time-shifted content with a timeline in a window of an application, the time-shifted content comprising a stored recording of an event;
   determining that a first comment is associated with a first time point of the time-shifted content in a database that associates each of a plurality of comments with a time point of a plurality of time points of the time-shifted content;
   presenting, at the first time point of the time-shifted content, the first comment over the time-shifted content in the window;
   determining that a second comment is associated with a second time point of the time-shifted content in the database, the second time point being sequential to the first time point; and
   presenting, at the second time point of the time-shifted content, the second comment over the time-shifted content in the window.

2. The computer-implemented method of claim 1, further comprising:
   presenting, with the first comment, the first time point over the time-shifted content in the window when the time-shifted content is played to the first time point along the timeline.

3. The computer-implemented method of claim 2, wherein presenting the first comment and the first time point comprises presenting the first comment and the first time point at a first position when the time-shifted content is played to the first time point of the time-shifted content along the timeline.

4. The computer-implemented method of claim 3, wherein the first comment and the first time point move over the time-shifted content in the window as the time-shifted content is played along the timeline.

5. The computer-implemented method of claim 3, wherein the first position is on a top-right corner of the window.

6. The computer-implemented method of claim 3, further comprising moving, downward, one or more earlier comments presented in the window, the one or more earlier comments associated with corresponding earlier time points of the time-shifted content in the database and the corresponding earlier time points earlier than the first time point.

7. The computer-implemented method of claim 3, further comprising:
   presenting the second comment and the second time point at the first position, when the time-shifted content is played to the second time point of the time-shifted content along the timeline; and
   moving the first comment and the first time point to a second position.

8. The computer-implemented method of claim 7, wherein the second position is immediately below the first position.

9. The computer-implemented method of claim 1, wherein presenting the first comment and the first time point comprises:
   presenting the first comment and the first time point over the time-shifted content on a section of the window that is transparent or partially transparent such that the time-shifted content is visible to a viewer through the section.

10. The computer-implemented method of claim 1, wherein the time-shifted content is stored in a first computing device, and the database is stored in a second computing device different from the first computing device.

11. A non-transitory computer-readable storage medium comprising instructions operable when executed to perform operations comprising:
    playing a time-shifted content with a timeline in a window of an application, the time-shifted content comprising a stored recording of an event;
    determining that a first comment is associated with a first time point of the time-shifted content in a database that associates each of a plurality of comments with a time point of a plurality of time points of the time-shifted content;
    presenting, at the first time point of the time-shifted content, the first comment over the time-shifted content in the window;
    determining that a second comment is associated with a second time point of the time-shifted content in the database, the second time point being sequential to the first time point; and
    presenting, at the second time point of the time-shifted content, the second comment over the time-shifted content in the window.

12. The non-transitory computer-readable storage medium of claim 11, wherein the operations further comprise:
    presenting, with the first comment, the first time point over the time-shifted content in the window when the time-shifted content is played to the first time point along the timeline.

13. The non-transitory computer-readable storage medium of claim 12, wherein presenting the first comment and the first time point comprises presenting the first comment and the first time point at a first position when the time-shifted content is played to the first time point of the time-shifted content along the timeline.

14. The non-transitory computer-readable storage medium of claim 13, wherein the first comment and the first time point move over the time-shifted content in the window as the time-shifted content is played along the timeline.

15. The non-transitory computer-readable storage medium of claim 13, wherein the first position is on a top-right corner of the window.

16. The non-transitory computer-readable storage medium of claim 13, wherein the operations further comprise moving, downward, one or more earlier comments presented in the window, the one or more earlier comments associated with corresponding earlier time points of the time-shifted content in the database and the corresponding earlier time points earlier than the first time point.

17. The non-transitory computer-readable storage medium of claim 13, wherein the operations further comprise:
    presenting the second comment and the second time point at the first position, when the time-shifted content is played to the second time point of the time-shifted content along the timeline; and
    moving the first comment and the first time point to a second position.

18. The non-transitory computer-readable storage medium of claim 17, wherein the second position is immediately below the first position.

19. The non-transitory computer-readable storage medium of claim 11, wherein presenting the first comment and the first time point comprises:
    presenting the first comment and the first time point over the time-shifted content on a section of the window that is transparent or partially transparent such that the time-shifted content is visible to a viewer through the section.

20. The non-transitory computer-readable storage medium of claim 11, wherein the time-shifted content is stored in a first computing device, and the database is stored in a second computing device different from the first computing device.

21. A system of one or more computers configured to perform operations comprising:
    playing a time-shifted content with a timeline in a window of an application, the time-shifted content comprising a stored recording of an event;
    determining that a first comment is associated with a first time point of the time-shifted content in a database that associates each of a plurality of comments with a time point of a plurality of time points of the time-shifted content;
    presenting, at the first time point of the time-shifted content, the first comment over the time-shifted content in the window;
    determining that a second comment is associated with a second time point of the time-shifted content in the database, the second time point being sequential to the first time point; and
    presenting, at the second time point of the time-shifted content, the second comment over the time-shifted content in the window.

22. The system of claim 21, wherein the operations further comprise:
    presenting, with the first comment, the first time point over the time-shifted content in the window when the time-shifted content is played to the first time point along the timeline.

23. The system of claim 22, wherein presenting the first comment and the first time point comprises presenting the first comment and the first time point at a first position when the time-shifted content is played to the first time point of the time-shifted content along the timeline.

24. The system of claim 23, wherein the first comment and the first time point move over the time-shifted content in the window as the time-shifted content is played along the timeline.

25. The system of claim 23, wherein the first position is on a top-right corner of the window.

26. The system of claim 23, wherein the operations further comprise moving, downward, one or more earlier comments presented in the window, the one or more earlier comments associated with corresponding earlier time points of the time-shifted content in the database and the corresponding earlier time points earlier than the first time point.

27. The system of claim 23, wherein the operations further comprise:
    presenting the second comment and the second time point at the first position, when the time-shifted content is played to the second time point of the time-shifted content along the timeline; and
    moving the first comment and the first time point to a second position.

28. The system of claim 27, wherein the second position is immediately below the first position.

29. The system of claim 21, wherein presenting the first comment and the first time point comprises:
    presenting the first comment and the first time point over the time-shifted content on a section of the window that is transparent or partially transparent such that the time-shifted content is visible to a viewer through the section.

30. The system of claim 21, wherein the time-shifted content is stored in a first computing device, and the database is stored in a second computing device different from the first computing device.

* * * * *